(12) United States Patent
Zhou

(10) Patent No.: US 10,295,204 B2
(45) Date of Patent: May 21, 2019

(54) DEHUMIDIZER

(71) Applicant: NINGBO FREE TRADE ZONE REFINE MOULD TECHNOLOGY CO., LTD, Ningbo, Zhejiang (CN)

(72) Inventor: Rui Zhou, Zhejiang (CN)

(73) Assignee: NINGBO FREE TRADE ZONE REFINE MOULD TECHNOLOGY CO., LTD., Ningbo, Zhejiang (CN)

( * ) Notice: Subject to any disclaimer, the term of this patent is extended or adjusted under 35 U.S.C. 154(b) by 0 days.

(21) Appl. No.: 15/831,568

(22) Filed: Dec. 5, 2017

(65) Prior Publication Data

US 2018/0328604 A1 Nov. 15, 2018

(30) Foreign Application Priority Data

May 15, 2017 (CN) .......................... 2017 1 0337704
May 15, 2017 (CN) ...................... 2017 2 0531063 U

(51) Int. Cl.
*F24F 3/153* (2006.01)
*F24F 12/00* (2006.01)
*F24F 3/14* (2006.01)

(52) U.S. Cl.
CPC ............ *F24F 3/153* (2013.01); *F24F 3/1405* (2013.01); *F24F 12/006* (2013.01); *F24F 2203/104* (2013.01)

(58) Field of Classification Search
CPC ........ F24F 3/153; F24F 3/1405; F24F 12/006; F24F 2203/104
See application file for complete search history.

(56) References Cited

U.S. PATENT DOCUMENTS

| 5,309,725 A * | 5/1994 | Cayce ................... F24F 3/1603 62/90 |
| 2009/0011885 A1* | 1/2009 | Robinson .............. F28D 19/048 474/257 |
| 2015/0369527 A1* | 12/2015 | Ghadiri Moghaddam .................. F24F 3/1423 62/89 |

* cited by examiner

*Primary Examiner* — Orlando E Aviles
(74) *Attorney, Agent, or Firm* — Charles C. Achkar; Ostrolenk Faber LLP

(57) ABSTRACT

A dehumidizer includes an upper air passage, a lower air passage, a rotary heat storage device, an evaporator, a condenser, a motor, and a fan. The upper air passage and the lower air passage are separated by a partition, and the right end of the upper air passage has an air inlet, and the right end of the lower air passage has an air outlet, and the left end of the upper air passage and the left end of the lower air passage are communicated with each other. The upper end of the rotary heat storage device is disposed in the upper air passage, and the lower end of the rotary heat storage device is disposed in the lower air passage, and the motor drives the rotary heat storage device to rotate. The evaporator, condenser and fan are installed sequentially from left to right into the lower air passage.

3 Claims, 1 Drawing Sheet

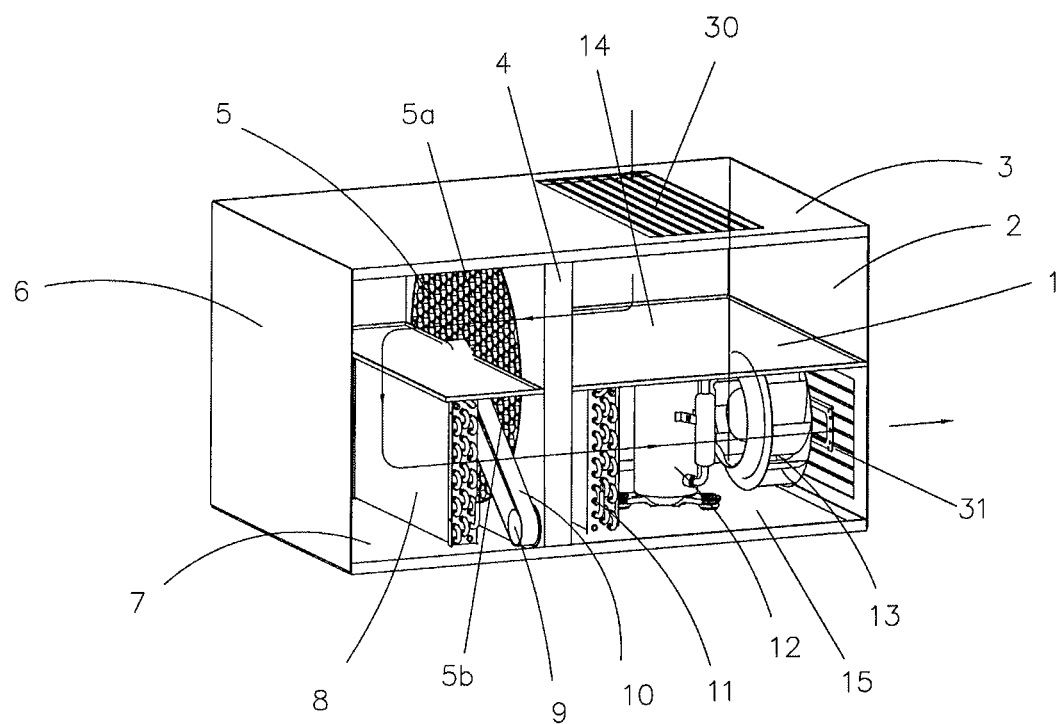

DEHUMIDIZER

CROSS REFERENCE TO RELATED APPLICATION

The present application claims priority to Chinese Application No. 201710337704.1, filed on May 15, 2017 and Chinese Application No. 201720531063.9 filed on May 15, 2017, the subject matters of which are incorporated by reference in their entirety.

FIELD OF INVENTION

The present invention relates to the field of air dehumidization, and more particularly to a dehumidizer.

BACKGROUND OF INVENTION

1. Description of the Related Art

Dehumidizer (also known as moisture removal machine, drying machine, and moisture remover) is mainly divided into home dehumidizer and industrial dehumidizer and belong to one of the air conditioning devices at home. In general, a conventional dehumidizer is comprised of a compressor, a heat exchanger, a fan, a water jet, a housing, and a controller. In the principle of operating the dehumidizer, the fan draws wet air into the dehumidizer and passes through the heat exchanger. Now, the water in air is condensed into water droplets, and the processed dry air is discharged from the dehumidizer, so that such loop can keep indoor humidity at an appropriate relative humidity.

To ensure higher heat exchange efficiency and greater dehumidization rate, the conventional dehumidizer generally comes with a longer air passage. The longer air passage can extend the air cooling and condensation time, but the longer air passage also causes a greater volume of the whole dehumidizer and an increased working power which incurs a waste of energy.

In addition, the conventional dehumidizer generally has a maximum working temperature around 40°. If the temperature is higher than 40°, the temperature of the whole dehumidizer rises due to the relatively larger volume, and the temperature in the air passage is also increased. In other words, the longer air passage limits the heat exchange effect and dehumidization effect of the air.

2. Summary of the Invention

Therefore, it is a primary objective of the present invention to overcome the aforementioned drawbacks of the prior art by providing a dehumidizer with small volume, high efficiency, and high maximum working temperature.

To achieve the aforementioned and other objectives, the present invention provides a dehumidizer comprising an upper air passage, a lower air passage, a rotary heat storage device, an evaporator, a condenser, a motor, and a fan.

The upper air passage and the lower air passage are separated from each other by the partition, and the right end of the upper air passage has an air inlet, and the right end of the lower air passage has an air outlet, and the left end of the upper air passage and the left end of the lower air passage are communicated to each other.

The upper end of the rotary heat storage device is disposed in the upper air passage, and the lower end of the rotary heat storage device is disposed in the lower air passage, and the motor drives the rotary heat storage device to rotate.

The evaporator, the condenser, and the fan are installed sequentially from left to right into the lower air passage, and the evaporator is disposed on the left side of the rotary heat storage device and proximate to the lower end of the rotary heat storage device, and the condenser is disposed on the right side of the rotary heat storage device.

Further, air enters from the air inlet through the upper end of the rotary heat storage device, the evaporator, the lower end of the rotary heat storage device, the condenser, and the fan, and exits from the air outlet.

The dehumidizer further comprises a chain, and the motor and the rotary heat storage device are transmittively coupled with each other through the chain.

The dehumidizer further comprises a compressor for cooperatively working with the evaporator and the condenser.

The dehumidizer of the present invention has the following advantages:

1. The air temperature drops after pre-cooling, and the humidity rises, so as to imrove the performance of the dehumidizer significantly.
2. The area of the thermal exchanger is reduced by 30%, and the capacity of the compressor is also reduced, so as to save costs.
3. The working temperature is increased from the original 40 □ to 55 □.

BRIEF DESCRIPTION OF THE DRAWINGS

FIG. 1 is a schematic view showing the structure of a dehumidizer of the present invention.

Wherein, the numeral 1 stands for partition, 2 for rear panel, 3 for top panel, 4 for heat storage device fixing frame, 5 for rotary heat storage device, 6 for front panel, 7 for chassis, 8 for evaporator, 9 for motor, 10 for chain, 11 for condenser, 12 for compressor, 13 for fan, 14 for upper air passage, 15 for lower air passage, 30 for air inlet, 31 for air outlet, 5a for the upper end of rotary heat storage device, and 5b for the lower end of rotary heat storage.

DESCRIPTION OF THE PREFERRED EMBODIMENTS

The above and other objects, features and advantages of this disclosure will become apparent from the following detailed description of the preferred embodiments taken with the accompanying drawings. It is noteworthy that the embodiments and figures disclosed herein are intended to be considered illustrative rather than restrictive.

With reference to FIG. 1 for a dehumidizer of the present invention, the dehumidizer comprises an upper air passage 14, a lower air passage 15, a rotary heat storage device 5, an evaporator 8, a condenser 11, a motor 9, and a fan 13.

The upper air passage 14 and the lower air passage 15 are separated from each other by the partition 1, and the right end of the upper air passage 14 has an air inlet 30, and the right end of the lower air passage 1 has an air outlet 31, and the left end of the upper air passage 14 and the left end of the lower air passage 15 are communicated with each other.

The upper end of the rotary heat storage device 5 is disposed in the upper air passage 14, and the lower end of the rotary heat storage device 5 is disposed in the lower air passage 15, and the motor 9 drives the rotary heat storage device 5 to rotate.

The evaporator 8, the condenser 11, and the fan 13 are installed sequentially from left to right into the lower air passage 15, and the evaporator 8 is disposed on the left side of the rotary heat storage device 5 and proximate to the lower end of the rotary heat storage device 5, and the condenser 11 is disposed on the right side of the rotary heat storage device 5, wherein the arrow in the figure shows the airflow direction.

The "left, right, top, and down" directions as described above are used for simplicity to illustrate the technical characteristics of the present invention, but persons having ordinary skill in the art should understand that the left and right directions and the top and bottom directions can be switched or arranged in another manner to implement the present invention, so that a selected direction is arbitrary as long as the positional relationship between components remains the same as the description of this preferred embodiment.

Specifically, the dehumidizer of the present invention comprises a top panel 3, a partition 1, a chassis 7, a front panel 6, and a rear panel 2, wherein the upper air passage 14 is formed between the top panel 3 and the partition 1, and the lower air passage 15 is formed between the partition 1 and the chassis 7. A heat storage device fixing frame 4 is installed between the top panel 3 and the chassis 7 and across the partition 1, and the rotary heat storage device 5 is installed on the heat storage device fixing frame 4. The front panel 6 is installed at the left end of the top panel 3 and the chassis 7 and at a position with a specific distance from the partition 1 in order to communicate the upper air passage 14 with the lower air passage 15. In the meantime, the rear panel 2 is coupled to the top panel 3, the partition 1, and the chassis 7 for partitioning the right end of the upper air passage 14 from the right end of the lower air passage 15. The air inlet 30 is formed at the right end of the top panel 3, and the air outlet 31 is formed on the rear panel 2 and disposed between the partition 1 and the chassis 7.

In the operation of the dehumidizer, air enters from the air inlet 30 and sequentially passes through the upper end 5a of the rotary heat storage device, an evaporator 8, the lower end 5b of the rotary heat storage device, the condenser 11, and the fan 13 and then exits from the air outlet 31.

Unlike the traditional dehumidizer, the present invention condenses the water in air at the evaporator 8 directly, and the condensed water is discharged from a pre-installed pipeline of the evaporator 8. Before the air enters into the evaporator, the air is pre-cooled by the upper end 5a of the rotary heat storage device, and the dry cold air in the evaporator 8 passes through the lower end 5b of the rotary heat storage and cools the lower end 5b of the rotary heat storage device. The lower end 5b of the rotary heat storage device and the upper end 5a of the rotary heat storage device may be switched by the motor 9 to achieve the effects of condensing cold air and exchanging heat with hot air in the room. Compared with the conventional dehumidizer, the dehumidizer of the invention has a smaller volume, and a higher heat exchange efficiency. The rotary heat storage device 5 achieves the first thermal loop of air.

In the meantime, the evaporator 8 and the condenser 11 operates correspondingly with each other, and the air is cooled by the evaporator 8 and heated by the condenser 11, so that the temperature of the condensed air (dehumidified air) reaches the level of room temperature when the air is discharged into a room. The evaporator 8 and the condenser 11 constitute a second thermal loop of air.

The aforementioned two thermal loops can improve the heat exchange efficiency and the dehumidization efficiency of the dehumidizer significantly, so as to achieve the effects of making the simplification of the air passage possible and the whole product structure more compact and smaller, reducing the effect of the ambient temperature on the operation of the dehumidizer, and increasing the maximum working temperature of dehumidizer.

In this preferred embodiment, the dehumidizer further comprises a chain 10, and the motor 9 and the rotary heat storage device 5 are transmittively coupled to each other through the chain 10.

In this preferred embodiment, the dehumidizer further comprises a compressor 12 for cooperatively operating with the evaporator 8 and the condenser 11.

The present invention has the following advantages:

1. The temperature drops after pre-cooling, and the humidity rises, so as to improve the performance of the dehumidizer significantly.

2. The area of the thermal exchanger is reduced by 30%, and the capacity of the compressor is also reduced, so as to save costs.

3. The working temperature is increased from the original 40° C. to 55° C.

While the invention has been described by means of specific embodiments, numerous modifications and variations could be made thereto by those skilled in the art without departing from the scope and spirit of the invention set forth in the claims.

What is claimed is:

1. A dehumidizer, comprising:
an upper air passage, a lower air passage, a rotary heat storage device, an evaporator, a condenser, a motor, a chain and a fan, characterized in that the upper air passage and the lower air passage are separated by a partition, and the right end of the upper air passage has an air inlet, and the right end of the lower air passage has an air outlet, and the left end of the upper air passage and the left end of the lower air passage are communicated with each other; and
an upper end of the rotary heat storage device is disposed in the upper air passage, and a lower end of the rotary heat storage device is disposed in the lower air passage between the evaporator and the condenser, and the motor drives the rotary heat storage device to rotate via said chain, which couples the motor and the rotary heat storage device and is located in a space downstream the evaporator and upstream the lower end of the rotary heat storage device; and
the evaporator, the condenser and the fan are installed sequentially from left to right into the lower air passage, and the evaporator is disposed on the left side of the rotary heat storage device and proximate to the lower end of the rotary heat storage device, and the condenser is disposed on the right side of the rotary heat storage device;
wherein the dehumidizer is configured to operate such that the air enters into the air inlet and then flows sequentially through an upper end of the rotary heat storage device, a left side of the evaporator, a right side of the evaporator, a portion of said chain, the lower end of the rotary heat storage device, the condenser, and the fan and exits from the air outlet;
wherein water in the air at the evaporator is condensed directly, and the condensed water is discharged from a pre-installed pipeline of the evaporator;
before the air enters into the evaporator, the air is pre-cooled by the upper end of the rotary heat storage device, and the dehumidified air in the evaporator passes through the lower end of the rotary heat storage device and cools the lower end of the rotary heat storage device;

the lower end of the rotary heat storage device and the upper end of the rotary heat storage device is switched by the motor to achieve the pre-cooling of the air before entering the evaporator;

the evaporator and the condenser operate correspondingly with each other, and the air is cooled by the evaporator and heated by the condenser, so that a temperature of the dehumidified air reaches a room temperature when the air is discharged into the room; and a working temperature of the dehumidizer is at 55° C.

2. The dehumidizer of claim 1, further comprising a compressor for cooperatively working with the evaporator and the condenser.

3. The dehumidizer of claim 1, wherein the upper air passage is formed between a top panel and the partition, and the lower air passage is formed between the partition and a chassis;

a heat storage device fixing frame is installed between the top panel and the chassis and across the partition, and the rotary heat storage device is installed on the heat storage device fixing frame;

a front panel is installed at a left end of the top panel and the chassis and at a position with a specific distance from the partition in order to communicate the upper air passage with the lower air passage;

a rear panel is coupled to the top panel, the partition, and the chassis for partitioning the right end of the upper air passage from the right end of the lower air passage;

the air inlet is formed at a right end of the top panel, and the air outlet is formed on the rear panel and disposed between the partition and the chassis.

\* \* \* \* \*